United States Patent
St. Clair et al.

(10) Patent No.: US 6,248,810 B1
(45) Date of Patent: *Jun. 19, 2001

(54) WATERBORNE DISPERSIONS OF EPOXIDIZED POLYDIENE BLOCK COPOLYMERS AND AMINO RESINS

(75) Inventors: David John St. Clair, Houston; James Robert Erickson, Katy, both of TX (US)

(73) Assignee: Shell Oil Company, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/389,520

(22) Filed: Feb. 16, 1995

Related U.S. Application Data

(62) Division of application No. 08/262,818, filed on Jun. 21, 1994, now abandoned.

(51) Int. Cl.[7] .................. C08L 53/02; C08L 61/24; C08L 61/28
(52) U.S. Cl. .................. 523/416; 525/92 K; 525/314
(58) Field of Search .................. 525/92, 407, 416, 525/92 K, 314; 523/416

(56) References Cited

U.S. PATENT DOCUMENTS

| | | | |
|---|---|---|---|
| 2,522,349 | 9/1950 | D'Ianni | 260/3 |
| 3,212,955 | 10/1965 | Kaizermann | 161/88 |
| 3,361,617 | 1/1968 | Kaizermann | 161/88 |
| 3,366,583 | 1/1968 | Wilson | 260/3 |
| 3,699,184 | * 10/1972 | Taylor et al. | 525/901 |
| 4,135,037 | * 1/1979 | Udipi et al. | 523/455 |
| 4,233,197 | * 11/1980 | Howell, Jr. | 525/510 |
| 4,237,245 | 12/1980 | Halasa et al. | 525/272 |
| 4,255,305 | * 3/1981 | Howell, Jr. | 523/416 |
| 4,374,965 | 2/1983 | Dickie et al. | 525/510 |
| 4,439,587 | 3/1984 | Martinez et al. | 525/292 |
| 4,486,571 | 12/1984 | Holubka | 525/110 |
| 4,507,446 | 3/1985 | Demmer | 525/523 |
| 4,508,765 | 4/1985 | Ring et al. | 525/481 |
| 4,596,843 | * 6/1986 | Wind | 523/416 |
| 4,786,705 | 11/1988 | Koleske | 528/72 |
| 4,957,967 | 9/1990 | Mizuno et al. | 525/68 |
| 5,149,895 | 9/1992 | Coolbaugh et al. | 526/173 |
| 5,210,359 | 5/1993 | Coolbaugh et al. | 526/173 |
| 5,229,464 | * 7/1993 | Erickson et al. | 525/271 |
| 5,247,026 | * 9/1993 | Erickson et al. | 524/314 |

FOREIGN PATENT DOCUMENTS

| | | |
|---|---|---|
| 151877 | 10/1950 | (AU) . |
| 0396780 | 11/1990 | (EP) . |
| 0441485 | 8/1991 | (EP) . |
| 0 498 426 A1 | 2/1992 | (EP) . |
| 1039378 | 8/1966 | (GB) . |

OTHER PUBLICATIONS

American Cyanamid Bulletin, "High Solids Amino Crosslinking Agents", 1990.*

"Melamine/Formaldehyde Crosslinkers: Characterization, Network Formation . . . ", D. Bauer, Prog. in Org. Coatings, 14, 1986, pp. 193–218.

*The Chemistry of Organic Film Formers* by D. H. Solomon published by J. Wiley & Sons, 1986, Ch. 9, pp. 222–250.

*American Cyanamid Product Sheets*, 1990.

*Fifty Years of Amino Coating Resins* by Albert J. Kirsch published in 1986 by American Cyanamid Co.

*Journal of Coatings Tech.*, vol. 51, No. 656, pp. 61–70, Sep. 1979, "Reaction Mechanism of Melamine Resins".

*Journal of Coatings Tech.*, vol. 51, No. 658, pp. 101–110, Nov. 1979, "Chemistry of Glycouril–Formaldehyde Resins and Their . . . ".

*Journal of Coatings Tech.*, vol. 52, No. 660, pp. 75–83, Jan. 1980, "Effect of Catalyst Structure on the Properties . . . ".

*Cymel 303 Crosslinking Agent*, published by American Cyanamid, 1990.

*High Solids Amino Crosslinking Agents*, published by American Cyanamid, 1990.

* cited by examiner

*Primary Examiner*—Robert E. L. Sellers
(74) *Attorney, Agent, or Firm*—Donald F. Haas

(57) ABSTRACT

A crosslinkble waterborne dispersion useful as a coating on metal substrates of an epoxidized polydiene block polymer composition which comprises: (a) 10 to 65% by weight of a polydiene block polymer containing at least five olefinic epoxy groups per molecule which are sterically hindered, (b) 0.2 to 25% by weight of a compatible aminoplast, (c) 0.1 to 10% by weight of a surfactant which is nonionic or anionic and has a volatile cation, and (d) the balance water. A water-continuous process and an inversion process for making a dispersion are also described.

18 Claims, No Drawings

WATERBORNE DISPERSIONS OF EPOXIDIZED POLYDIENE BLOCK COPOLYMERS AND AMINO RESINS

This is a division, of application Ser. No. 08/262,818, filed Jun. 21, 1994 abandoned.

BACKGROUND OF THE INVENTION

This invention relates to waterborne dispersions of epoxidized polydiene block polymers. More specifically, the invention relates to waterborne dispersions of such polymers and amino resins which can be crosslinked to make cured films, coatings, adhesives, sealants, caulks, binders and modifiers for asphalt.

Epoxidized polydiene polymers have been disclosed recently in U.S. Pat. Nos. 5,229,464 and 5,247,026. These are relatively low epoxy content polymers. Higher epoxy content polymers are described in copending, commonly assigned United States patent application Ser. No. 228,047, filed Apr. 15, 1994, entitled "Epoxidized Low Viscosity Rubber." It has been shown that such polymers are useful in high solids, solvent-borne adhesives and coatings and that formulations containing these polymers and a cationic photoinitiator can be cured via ultraviolet radiation. It has also been shown that formulations containing these polymers, a melamine resin, and an acid catalyst can be cured by baking under normal bake conditions.

Although this high solids technology is of great value, it is true that if such polymers could be dispersed in water, the utility of these polymers would be greatly broadened. This would allow preparation of low viscosity, waterborne formulations having very low volatile organic compound (VOC) contents. By adding waterborne epoxidized polydiene polymer dispersions to other water-based products having compatible surfactant systems, these polymers could be used to modify other types of resins and this could be done without concern about phase separation due to incompatibility of the epoxidized polydiene polymers and solvent-based resins.

It is one object of the present invention to provide a crosslinkable waterborne dispersion of epoxidized polydiene polymers and amino resins. Another object of this invention is to provide a method for maldng such crosslinkable waterborne dispersions.

SUMMARY OF THE INVENTION

The present invention provides a water dispersion of a crosslinkable epoxidized polydiene block polymer composition which comprises:

(a) 10 to 65% by weight (% w) of a polydiene block polymer containing at least 5 olefinic epoxy groups per molecule which are sterically hindered and which preferably do not have a significant amount of other functional groups, (b) 0.2 to 25% w of a compatible amino resin, (c) 0.1 to 10% w of a nonionic surfactant or an anionic surfactant having a volatile cation, and (d) the balance water.

In a preferred embodiment of the present invention, the compatible aminoplast is a butylated aminoplast and the surfactant is an anionic surfactant composed of an amine salt of an acid which can be used to catalyze the crosslinldng of the polymer and the aminoplast such as paratoluene sulfonic acid or dodecylbenzene sulfonic acid.

This invention also describes processes for making such crosslinkable waterborne dispersions. One method involves making a hot aqueous solution of the surfactant, adding a mixture of an epoxidized block polymer and a compatible aminoplast to the hot aqueous solution, and then mixing the components under high shear conditions. The preferred method involves mixing together at a temperature of 25 to 90° C. with vigorous agitation an epoxidized polydiene block polymer, an aminoplast, and the desired surfactant, and then adding water to the mixture slowly over a period of at least 15 minutes.

DETAILED DESCRIPTION OF THE INVENTION

The general methods of making block copolymers are reviewed by R. P. Quirk and J. Kim, "Recent Advances in Thermoplastic Elastomer Synthesis," Rubber Chemistry and Technology, volume 64 No. 3 (1991), which is incorporated herein by reference. Especially useful is the method of sequential anionic polymerization of monomers. The types of monomers that will undergo living polymeriation are relatively limited for the anionic method, with the most favorable being conjugated diolefins and monoalkenyl aromatic hydrocbon monomers. Generally, a hydrogenation step is needed to prepare a saturated polymer. Hence, a polymer of this invention that is both epoxidized and saturated usually requires both an epoxidation and a hydrogenation step. However, polymers made by sequential polymerization of a suitable diolefin monomer and a monomer having only one carbon carbon double bond or by sequential polymerization of two different mixtures (ratios) of such monomers, using either a monofunctional initiator, a monofunctional initiator and a coupling agent, or a multifunctional initiator, may be epoxidized and would not have to be hydrogenated to produce an epoxidized polymer of this invention that is saturated. Preferred polymers for use herein are described in detail in the aforementioned U.S. patents and patent application which are herein incorporated by reference.

The polymers containing olefinic unsaturation or both aromatic and olefinic unsaturation may be prepared using anionic initiators or polymerization catalysts. Such polymers may be prepared using bulk, solution or emulsion techniques. Polymers prepared in solution are preferred for subsequent epoxidation and hydrogenation.

The polymer may be epoxidized under conditions that enhance the epoxidation of the more highly substituted olefinic double bonds, such as by the use of peracetic acid, wherein the rate of epoxidation is generally greater the greater the degree of substitution of the olefinic double bond (rate of epoxidation:tetrasubstituted>trisubstituted> disubstituted >monosub-stituted olefinic double bond). If a substantially saturated polymer is desired, the epoxidized polymer may be hydrogenated to remove substantially all remaining olefinic double bonds (ODB) and normally leaving substantially all of the aromatic double bonds. If only substantially saturated interior blocks are desired, the epoxidized polymer may be partially hydrogenated in a selective manner with a suitable catalyst and conditions (like those in Re 27,145, U.S. Pat. No. 4,001,199 or with a titanium catalyst such as is disclosed in U.S. Pat. No. 5,039,755, all of which are incorporated by reference; or by fixed bed hydrogenation) that favor the hydrogenation of the less substituted olefinic double bonds (rate or hydrogenation: monosubstituted>disubstituted>trisubstituted>tetrasubstituted olefinic double bonds) and also leaves aromatic double bonds intact In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls and anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. The conjugated diolefins which may be used in the present invention include isoprene (2-methyl-1,3-butadiene), 2-ethyl-1,3-butadiene, 2-propyl-1,3-butadiene, 2-butyl-1,3-butadiene, 2-pentyl-1,3-butadiene(2-amyl-1,3-butadiene),2-hexyl-1,3-butadiene, 2-heptyl-1,3-butadiene, 2-octyl-1,3-butadiene,2-nonyl-1,3-butadiene,2-decyl-1,3-butadiene,2-dodecyl-1,3-butadiene, 2-tetradecyl-1,3-butadiene, 2-hexadecyl-1,3-butadiene, 2-isoamyl-1,3-butadiene, 2-phenyl- 1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene (myrcene), 2-methyl-1,3-nonyldiene, 2-methyl-1,3-decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Also included are 1,3-butadiene, piperylene, 4,5-diethyl-1,3-octadiene and the like. Di-substituted conjugated diolefins which may be used include 2,3-dialkyl-substituted conjugated diolefins such as 2,3-dimethyl-1,3-butadiene,2,3-diethyl-1,3-pentadiene,2,3-dimethyl-1,3-hexa-diene, 2,3-diethyl-1,3-heptadiene, 2,3-dimethyl-1,3-octadiene and the like and 2,3-fluoro-substituted conjugated diolefins such as 2,3-difluoro-1,3-butadiene, 2,3-difluoro-1,3-pentadiene, 2,3-difluoro-1,3-hexadiene, 2,3-difluoro- 1,3-heptadiene, 2,3-fluoro-1,3-octadiene and the like. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

There are a wide variety of coupling agents or initiators that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972; 3,135,716; 3,078,254; 4,096,203 and 3,594,452 which are herein incorporated by reference. When the coupling agent has two reactive sites such as dibromoethane, the polymer will have a linear A—B—A structure. When the coupling agent has three or more reactive sites, such as silicon tetrachloride, the polymer will have a branched structure, such as $(A—B)_n—X$. Coupling monomers are coupling agents where several monomer units are necessary for every chain end to be coupled. Divinylbenzene is the most commonly used coupling monomer and results in star polymers.

In general, any of the solvents known in the prior art to be useful in the preparation of such polymers may be used. Suitable solvents, then, including straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0 and 100° C. using an alkyl lithium initiator. The living polymer chains are usually coupled by addition of divinyl monomer to form a star polymer. Additional monomers may or may not be added to grow more arms or to terminally functionalize and the polymer and the living chain ends are quenched with a proton source such as methanol or hydrogen. Polymerization may also be initiated from monomers such as m-divinylbenzene and m-diisopropenylbenzene treated with butyl lithium.

The epoxidized block copolymers may have weight average molecular weights of from about 2,000 to about 3,000,000. Lower molecular weights require excessive crosslinking whereas higher molecular weights cause very high viscosity, making processing very difficult. More preferably, the polymer is one having a weight average molecular weight of from about 3,000 to about 1,000,000. Most preferably, the polymer is one having a weight average molecular weight of from about 4,000 to about 200,000 because this offers the best balance between cost, ability to use the mildest curing conditions and achieving good processing behavior. It is preferred that the blocks comprising predominantly epoxidized diolefin monomer units have molecular weights between about 200 and about 200,000 and, if present, the blocks comprising predominantly aromatic monomer units have molecular weights between about 500 and about 50,000 because polymers built from larger blocks are very difficult to process and smaller blocks fail to adequately crosslink.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the suitable calibration standards are narrow molecular weight distribution polystyrene polymers. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American laboratory*, 63, May, 1978.

The epoxidized copolymers of this invention can be prepared by the epoxidation procedures as generally described or reviewed in the *Encyclopedia of Chemical Technology* 19, 3rd ed., 251–266 (1980), D. N. Schulz, S. R. Turner, and M. A. Golub, *Rubber Chemistry and Technology*, 5, 809 (1982), W-K. Huang, G-H. Hsuie, and W-H. Hou, *Journal of Polymer Science. Part A: Polymer Chemistry*, 26, 1867 (1988), and K. A. Jorgensen, *Chemical Reviews*, 89, 431 (1989), and Hermann, Fischer, and Marz, *Angew. Chem. Int. Ed. Engl.* 30 (No. 12), 1638 (1991), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight carboxylic acid such as formic acid. Alternatively, hydrogen peroxide in the presence of acetic acid, or acetic anhydride and a cationic exchange resin, will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of 0 to 130° C. and reaction times from 0.1 to 72 hours may be utilized. When employing hydrogen peroxide and acetic or formic acid together with a catalyst such as sulfuric acid, the product can be a mixture of epoxide and hydroxy ester. Due to these side reactions caused by the presence of an acid and to gain the maximum selectivity with respect to different levels of substitution on the olefinic double bonds, it is preferable to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag, or with methyl-trioxorhenium/hydrogen peroxide with or without amines present. $^1$H NMR is an effective tool to determine which and how much of each type of ODB is epoxidized.

Although epoxide functionality is predominant in the polymers of the present invention, the polymers may also contain small amounts of functional groups that are normally considered necessary for amino resin crosslinking— i.e. groups containing active protons such as hydroxy, carboxy, mercaptan, and amine. Quantitizing what constitutes a small amount of functional groups is difficult at best because of differences among various amino resins, acids, polymers, the level of these in a given formulation, the type of functional group, the conditions of cure, etc. Also complicating the matter is the degree of cure required by the enduse application. Only a high polymer gel content may be needed to impart a needed property, or both high gel content and a significant crosslink density, enough to prevent appreciable swelling by a good solvent, may be needed. Despite these complications, the amount of functional groups other than epoxide groups will usually be less than 0.1 meq/gm.

Any polymer containing at least five olefinic epoxy groups per molecule which are sterically hindered may be crosslinked according to the present invention. Amino resin crosslinking will most likely take place as long as there are some sterically hindered olefinic epoxy groups present on the polymer. It is best that there be at least five such groups present on the polymer to insure that there are any at all. In anionic polymerization, it is difficult to consistently place less than 5 diene monomers on a molecule. Useful products may be made from polymers containing from 5 sterically hindered epoxy groups per molecule to as many as 250 sterically hindered epoxy groups per molecule.

Sterically hindered means the olefinic epoxy groups are di-, tri- or tetra-alkyl substituted. Tri- and tetra-alkyl substitution is preferred. This is described in detail in copending, commonly assigned U.S. patent application Ser. No. 08/081,950, filed Jun. 22, 1993, entitled "Method of Chemically Crosslinking Sterically Hindered Epoxidized Polymers" which is herein incorporated by reference.

Polymers having epoxy groups of the following structures are preferred:

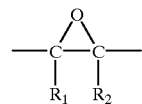

(1)

where $R_1$ and $R_2$ are selected from the group consisting of hydrogen, alkyl, alkenyl, and aryl,

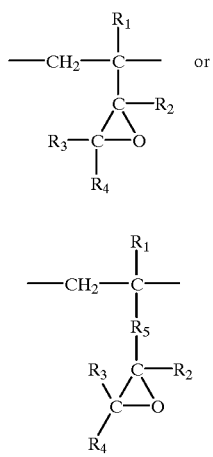

(2)

(3)

where $R_1$, $R_2$, $R_3$ and $R_4$ are selected from the group consisting of hydrogen, alkyl, alkenyl and aryl and at least one of $R_2$, $R_3$ and $R_4$ is not hydrogen and $R_5$ is selected from the group consisting of alkyl, alkenyl and aryl.

A specific example is a polymer made from 1,3-isoprene monomer such that epoxidized 1,4-isoprene units are produced. An epoxidized 1,4-isoprene unit contains structural feature 1 where $R_1$ is hydrogen and $R_2$ is $CH_3$.

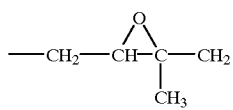

(1)

Another example is an isoprene based polymer where epoxidized 3,4-isoprene monomer units result. This is an example of structure 2 where $R_2$ is $CH_3$ and $R_1=R_3=R_4=$hydrogen.

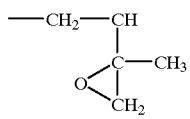

(2)

The above polymers lack active protons and, prior to the invention described in application Ser. No. 08/081,950, had not been considered crosslinkable with amino resins. These polymers may be crosslinked with themselves or with other polymers of the type described herein. They may also be crosslinked with polymers that are normally crosslinkable with amino resins such as polyesters, "advanced" epoxy resins (which possess secondary alcohol groups), acrylics, alkyds, polyurethanes, etc.

The crosslinking agents which are useful in the present invention are aminoplasts. For the purposes of this invention, an aminoplast is a resin made by reaction of a material bearing NH groups with a carbonyl compound and an alcohol. The NH bearing material is commonly urea, melamine, benzoguanamine, glycoluril, cyclic ureas, thioureas, guanidines, urethanes, cyanamides, etc. The most common carbonyl component is formaldehyde and other carbonyl compounds include higher aldehydes and ketones. The most commonly used alcohols are methanol, ethanol, and butanol. Other alcohols include propanol, hexanol, etc. American Cyanamid (renamed CYTEC) sells a variety of these aminoplasts, as do other manufacturers. American Cyanamid's literature describes three classes or "types" of aminoplasts that they offer for sale.

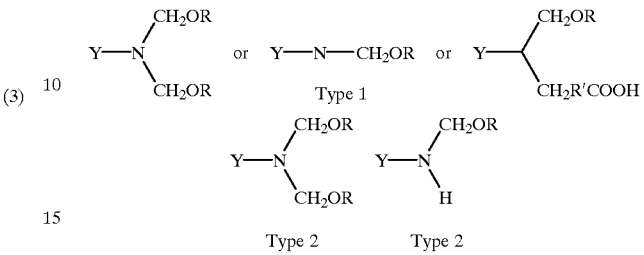

where Y is the material that bore the NH groups, the carbonyl source was formaldehyde and R is the alkyl group from the alcohol used for alkylation. Although this type of description depicts the aminoplasts as monomeric material of only one pure type, the commercial resins exist as mixtures of monomers, dimers, trimers, etc. and any given resin may have some character of the other types. Dimers, trimers, etc. also contain methylene or ether bridges. Generally, type 1 aminoplasts are preferred in the present invention.

The aminoplast must be compatible with the epoxidized polymer. A compatible aminoplast is defined as one which gives a phase stable blend with the epoxidized polymer at the desired concentration and at the temperature to which the mixture will be heated when the dispersion in water is actually being made. We have found that it is best that the aminoplast be butylated to a significant extent for proper compatibility with the epoxidized polymers, i.e., the R groups must be butyl groups or at least primarily butyl groups.

For example, the following type 1 aminoplasts can be used to achieve the purpose of the present invention: CYMEL 1156—a melamine-formaldehyde resin where R is $C_4H_9$, CYMEL 1170—a glycoluril-formaldehyde resin where R is $C_4H_9$, CYMEL 1141—a carboxyl modified amino resin where R is a mixture of $CH_3$ and i-$C_4H_9$, and BEETLE 80—a urea-formaldehyde resin where R is $C_4H_9$. All of these products are made by American Cyanamid Company and are described in its publication 50 *Years of Amino Coating Resins,* edited and written by Albert J. Kirsch, published in 1986 along with other amino resins useful in the present invention.

CYMEL 1170 is the following glycoluril-formaldehyde resin where R is $C_4H_9$:

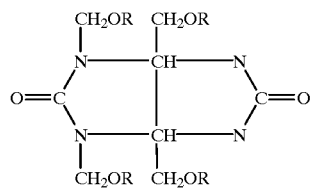

Another is BEETLE® 80 urea-formaldehyde resin where R is $C_4H_9$ whose ideal monomeric structure is depicted:

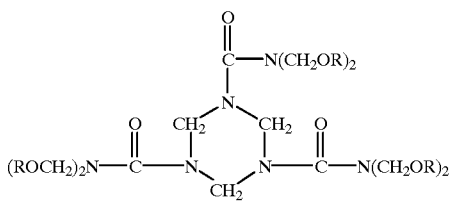

Since there are little or no other functional groups, such as hydroxyl, amine, mercaptan or carboxyl groups, in the epoxidized polymers which are cured according the present invention, the conventional mechanism by which these aminoplasts cure functionalized polymers cannot be used to explain the reaction in the present system. A hypothesis which we put forth as a theory herein is discussed in detail in the aforementioned copending application Ser. No. 08/081,950 which is herein incorporated by reference.

In the crosslinkable waterborne dispersion, the epoxidized polydiene block polymer should comprise from 10 to 65% by weight (% w) of the total dispersion. The aminoplast should be used in a ratio of 98:2 to 60:40 by weight with the epoxidized polymer. Thus, the aminoplast will comprise from 0.2 to 25% w of the dispersion. The dispersion will also require a surfactant, preferably an amine salt of an acid. The surfactant is used in an amount from 0.1 to 10% w.

If less than 10% w of the polymer is used, then the solids content of the dispersion will be uneconomically low and if more than 65% w is used, then the viscosity of the dispersion (if it can be made at all) will be too high. If less than 0.2% w of the amino resin is used, then the composition will not crosslink and if more than 25% w is used, then compatibility with the epoxidized polymer will be poor and poor quality cured films will result. If less than 0.1% w of the surfactant is used, then stable dispersions in water cannot be made and if more than 10% w of the surfactant is used, then cured films will have high moisture sensitivity. The balance of the dispersion is water.

Since the epoxidized polydiene polymer and its mixtures with melamine resin are hydrophobic and insoluble in water, a surfactant must be used to form a stable dispersion of the polymer and melamine in water. A wide variety of nonionic and anionic surfactants would be suitable. There are almost no restrictions on the type of nonionic surfactant which could be considered. The only restriction on the type of anionic surfactant is that the cation used to neutralize the acid on the hydrophobe must be volatile enough to leave the film during the melaniine cure. Otherwise, a nonvolatile cation would neutralize the strong acid needed to catalyze the melamine curing reaction, thereby inhibiting cure. In fact, the preferred anionic surfactant is the one made by neutralizing the strong acid needed to catalyze the curing reaction with a volatile amine. The amine-neutralized acid serves as the surfactant stabilizing the dispersion and then, after the film is cast, the amine volatilizes, regenerating the acid which catalyzes the melamine cure.

Surfactants are molecules which have a hydrophobic portion (A) and a hydrophilic portion (B). They may have the structure A—B, A—B—A, B—A—B, etc. Typically, the hydrophobic section can be an alkyl group (e.g. $C_{12}$), an alkyl/aryl group (e.g. octylphenol), a polypropylene oxide block, a polydimethylsiloxane block or a fluorocarbon. The hydrophilic block of a nonionic surfactant is a water soluble block, typically a polyethylene oxide block or a hydroxylated polymer block. The hydrophilic block of an anionic surfactant is typically an acid group ionized with a base. Typical acid groups are carboxylic acids, sulfonic acids or phosphoric acids. Typical bases used to ionize the acids are NaOH, KOH, $NH_4OH$ and a variety of tertiary amines, such as triethyl amine, triisopropyl amine, dimethyl ethanol amine, methyl diethanol amine and the like. Nonvolatile bases such as NaOH and KOH should be avoided in this invention since they will neutralize the strong acid needed to catalyze the melamine curing reaction.

A proton-donating acid catalyst is required to achieve the purposes of the present invention, i.e., crosslink the polymer using the aminoplasts described above. It is normal that the amount of the acid catalyst used range from about 0.1 to about 4% w of the polymer/amine resin mixture to be certain there is sufficient acid but an excess can be undesirable. Most preferably, from about 0.5 to about 2% w of the polymer/amine resin is used. The presence of a strong proton-donating acid is normally required to catalyze the crosslinking reaction of many aminoplasts which are useful in the present invention. However, some medium strength and even relatively weak acids may also be effective depending upon the aminoplasts used. Generally, the most active catalyst are those with the lowest pKa values. The following list of acid catalysts which may be used in the present invention is arranged according to increasing pKa value: mineral acids, Cycat® 4040 catalyst (p-toluene sulfonic acid), Cycat® 500 catalyst (dinonylnaphthalene disulfonic acid), Cycat® 600 catalyst (dodecyl benzene sulfonic acid), oxalic acid, maleic acid, hexamic acid, phosphoric acid, Cycat® 296-9 catalyst (dimethyl acid pyrophosphate), phthalic acid and acrylic acid (copolymerized in polymer). Other acids which may be used are described in the aforementioned American Cyanamid Company publication. Also, 3M Brand Resin Catalyst FC-520 (diethylammonium salt of trifluoromethane sulfonic acid) may be used. Cycat® 600 was found to be a very useful catalyst.

It is highly preferred that the acid which is used in the surfactant be an acid which is capable of catalyzing the crosslinkling of the polymer and the aminoplasts. Such acids are described above and include the various sulfonic acids described in the preceding paragraph. After the dispersion is applied to a substrate, usually after being formulated for a specific application such as a coating, adhesive or sealant, the volatile amine in the surfactant will evaporate into the atmosphere, freeing the acid to catalyze the curing reaction between the amino resin and the epoxidized polymer. This is highly advantageous because it eliminates the cost of adding separate surfactant and acid catalyst components to the process for making these dispersions and also because it is a very simple and very effective approach to preparing dispersions in water. However, it is within the scope of this invention to use a nonionic or anionic surfactant to make the dispersion of epoxidized polymer/aminoplast which does not utilize the amine salt of the acid which can catalyze the curing reaction. In this case, of course, the acid catalyst would then have to be added to the dispersion.

The curing generally occurs within 5 seconds to 60 minutes, preferably 10 to 30 minutes, once the polymer and aminoplast are exposed to the catalyst and usually high temperature. However, curing could occur at near ambient temperature over a period of up to 60 days such as for construction mastics, laminating adhesives and flexible packaging laminating adhesives.

The cure temperature generally ranges from −5° C. to 400° C. 100 to 300° C. is preferred and 100 to 200° C. is most preferred. In some applications, such as coil coating, curing is accomplished through heating to a maximum substrate surface temperature of up to 300° C. If this cure schedule is used, the time at this temperature is generally very short (on the order of 5 seconds) and cure continues as the surface cools.

Premature crosslinking is prevented by blocking the acid catalyst as an amine salt. The most preferred amine used in this work is triethylamine. Other blocking agents include triisopropylamine, dimethylethanolamine, methyldiethanolamine, diethyl-ethanolamine, triethanolamine, diisopropanolamine, morpholine and 2-amino-2-methyl-1-propanol, water, primary, secondary and tertiary alcohols, as well as others described in the aforementioned American Cyanamid Company publication.

One method for making the dispersions of the present invention is the water-continuous process. In this process, the epoxidized polymer and the amino resin, heated to reduce viscosity so it can be handled easily, usually to about 25 to about 80° C., are added to a hot water solution of the surfactant and dispersed preferably under high shear conditions. This process is easy to use because the viscosity is always low since water is always the continuous phase.

Dispersions according to the present invention can also be made by the inversion process. In this process, the epoxidized polymer and the amino resin are mixed at about 25 to about 90° C. with, for example, a stirrer composed of two 4-blade propellers on a shaft rotating at about 500 to 5000 rpm. Water is added slowly over a period of at least 15 minutes. The mix is organic-continuous initially. As water is slowly added, the viscosity increases. The viscosity becomes very high as the inversion point is approached. As more water is added, the dispersion inverts from organic-continuous to water-continuous and the viscosity drops dramatically. This process is preferred over the water-continuous process because it usually gives a better, smaller particle size, more stable dispersion.

The present invention has many advantages. The main advantage is that the products can be applied at ambient temperatures as low viscosity liquids without the use of large quantities of solvents. Another advantage is that it avoids the problem of radiation curing which primarily is the cost of the expensive equipment or formulation ingredients required for such crosslinking. The present invention also avoids the problems associated with radiation cure of coatings on irregularly-shaped objects. The waterborne dispersions can also be used as additives to other waterborne polymers having compatible surfactant systems to enhance specific properties such as toughness and flexibility.

The crosslinked materials of the present invention are useful in adhesives (including pressure sensitive adhesives, contact adhesives, laminating adhesives and assembly adhesives), sealants, coatings, films (such as those requiring heat and solvent resistance), printing plates, fibers, and as modifiers for polyesters, polyethers, polyamides and epoxies. In addition to the epoxidized polymer and any curing aids or agents, products formulated to meet performance requirements for particular applications may include various combinations of ingredients including adhesion promoting or tackifying resins, plasticizers, fillers, solvents, stabilizers, etc.

Adhesive compositions of the present invention may be utilized as many different kinds of adhesives, for example, laminating adhesives, flexible packaging laminating adhesives, pressure sensitive adhesives and tie layers. The adhesive can consist of simply the epoxidized polymer or, more commonly, a formulated composition containing a significant portion of the epoxidized polymer along with other known adhesive composition components.

One preferred use of the present formulation is the preparation of pressure-sensitive adhesive tapes and labels. Normally, the polymer dispersions of this invention win be mixed with a dispersion of a compatible tackifying resin prior to application to the backing. The pressure-sensitive adhesive tape comprises a flexible backing sheet and a layer of the adhesive composition of the instant invention coated on one side of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is near zero, the compositions of the present invention may be used for a sizing agent or saturant for paper, fabric or other fibers and for toughening asphalt and the like.

Another preferred use of the present formulation is the preparation of coatings for substrates that can be baked at the temperatures described above. Such coatings are expected to be of particular importance for automotive and general metal finishes, especially coil coats. As will be seen in the following examples, coatings can be prepared with excellent color, clarity, hardness and adhesion. If substantially saturated polymers are used, the weatherability of the resulting films is expected to be excellent.

EXAMPLES

Two epoxidized polymers were used to demonstrate this invention. Polymer A was a 6000 molecular weight (MW) triblock polymer having 1000 MW polyisoprene blocks on both ends of a center block composed of a random copolymer of polystyrene (2500 MW) and hydrogenated polybutadiene (1500 MW). The polymer was epoxidized to 1.2 milliequivalents (meq) of the epoxy per gram of polymer (meq/g). Polymer B was a 6000 MW diblock polymer having a 1000 MW polyisoprene block and a 5000 MW polybutadiene block. The polymer was epoxidized to 4.8 meq/g. The acid used was CYCAT 600, dodecyl benzene sulfonic acid (a 70% weight solution in isopropyl alcohol). Ammonia ($NH_3$) or triethylamine (TEA) was used to neutralize the acid. Three melamine resins were tested in the formulation, a fully methylated melamine (CYMEL 303), a fully butylated melamine (CYMEL 1156), and an acid functional, methylated/butylated melanine (CYMEL 1141). A silicone antifoam (BYK-034) was used in formulations where foaming was a problem.

Two processes were used to prepare the dispersions; the water-continuous process and the inversion process. In the water-continuous process, the organic part of the formulation, heated to about 80° C., was added to hot water containing the CYCAT 600/amine surfactant and was dispersed in the soapy water using a Silverson high shear mixer/emulsifier. In the inversion process, the organic part of the formulation was mixed in a can at about 80° C. with a stirrer composed of two 4-blade propellers on the shaft, rotating at about 2000 rpm. Water was added slowly over about a 30 minute period. Of course, the mix was organic continuous initially. As water was slowly added, viscosity increased. Viscosity became very high as the inversion point was approached. As more water was added, the dispersion inverted from organic-continuous to water-continuous and the viscosity dropped dramatically. The compositions of the dispersions made in this work with Polymer A are shown in the table.

Example 1

The simplest dispersion (Composition #1) consists of Polymer A dispersed in water containing the surfactant (CYCAT 600/NH$_3$) and antifoam (BYK-034). When made by the inversion process, this gave a nice, low viscosity, milky white dispersion. Since this dispersion contains no crosslinker, films cast on a substrate dry clear and glossy but they are sticky. This dispersion could have utility as an additive to other water based products with which it could cocure. Although difficult, it may be possible to add a melamine curing resin to this dispersion of polymer in water, thereby giving a product which would crosslink.

Example 2

A better approach to a dispersion which would cure is to make a premix of the melamine and the polymer together before dispersing this premix in water to insure intimate mixing of the polymer and crosslinker. To determine the feasibility of this approach, three melamine resins, CYMEL 303, 1141 and 1156, were melt mixed manually with Polymer A at about 100° C. in a 20/80 ratio by weight of resin/polymer. It was found that CYMEL 1141 and 1156 gave homogeneous blends but the blend with CYMEL 303 phase separated upon cooling to room temperature and standing overnight. The incompatibility with CYMEL 303 is surprising since CYMEL 303 was an effective crosslinker for Polymer A when films were cast from solvent solution.

Attempts were made to prepare dispersions of Polymer A with each of the three CYMEL resins. Good dispersions could be made using CYMEL 1141 and 1156. However, as shown by Compositions #2, #3 and #4, attempts at dispersing Polymer A/CYMEL 303 blends in water were unsuccessful, even when a coalescing solvent, ethylene glycol monobutyl ether (BUTYL OXITOL) was present.

Since CYMEL 1141 contains some acid functionality, it probably aids formation of the dispersions. Using NH$_3$ to neutralize CYCAT 600 and the acid groups on CYMEL 1141, a nice dispersion of 80/20 by weight Polymer A/CYMEL 1141 was formed with the Silverson (Composition #5). An attempt to make this same dispersion by the inversion process was unsuccessful (Composition #6). As water was added, the mix became so thick that it climbed out of the can as the stirrer attempted to mix it. It was found that addition of BUTYL OXITOL was effective in reducing the viscosity of the mix enough that good dispersions could be made by the inversion process. The dispersion using 10% by weight BUTYL OXITOL (Composition #7) looked nice originally but coagulated upon storage at room temperature for 3 months. The dispersion using 20% by weight BUTYL OXITOL (Composition #8) creamed but remained dispersed upon storage. Using TEA to neutralize the acid, a nice dispersion was made with only 10% by weight BUTYL OXITOL (Composition #9) and this dispersion remained unchanged upon storage for 3 months at room temperature.

Films of Compositions #8 and 9 were drawn down on aluminum panels (A412 Q-panels) with a #52 wire wound rod. After drying overnight at ambient conditions, the films were smooth and coherent, and they were tacky because uncured Polymer A is very tacky. Surprisingly, when baked, films of Composition #8 did not cure, even after 30 minutes at 200° C. However, films of Composition #9 did cure to give non-tacky films after a 15 minute bake at 200° C. These cured films of Composition #9 were fairly dull and hazy suggesting at least partial incompatibility between the melamine and Polymer A when they begin to cure.

Example 3

To minimize this partial incompatibility of Polymer A and CYMEL 1141, the polymer and melamine were partially reacted prior to dispersing them in water. Enough reaction must be accomplished that Polymer A and CYMEL 1141 are compatible during cure but too much reaction will cause the mix to be high in viscosity, making inversion to the water dispersion difficult. The procedure used to prepare Composition #10 was satisfactory.

In the procedure to make Composition #10, 80 parts by weight (pbw) Polymer A, 20 pbw CYMEL 1141, and 18 pbw BUTYL OXITOL were heated to 80° C. in a resin kettle. While stirring, 0.4 pbw CYCAT 600 diluted with 2 pbw BUTYL OXITOL was added and the mixture was cooked for 2 hours. The surfactant was prepared by mixing 1.6 pbw CYCAT 600 and 2 pbw TEA in a bottle with 5 pbw water. This surfactant was added to the partially reacted Polymer A/CYMEL 1141 at 70° C. while stirring at 2,000 rpm with a stirrer having dual 4-bladed propellers. Blowing ambient temperature air on the can helped control the temperature rise due to viscous heating. Deionized water was then slowly added.

Since some of the volatile TEA was lost during the dispersion, 2% by weight TEA was in the water being added to the mix in order to maintain a pH of at least 9. If the water was added too quickly (in less than about 5 minutes), a dispersion was obtained which creamed upon standing overnight (probably because the particle size was too large). However, if the water was added over about a 15 to 30 minute period, a very nice dispersion which did not change with storage, was obtained. Inversion occurred after adding about 100 pbw of water but the viscosity was still quite high. For Composition #10, more water was added until the viscosity became fairly low. Excluding the water, Composition #10 contains about 79% w solids and 21% w solvent. Films of Composition #10 on aluminum cured well when baked 20 minutes at 175° C. to give excellent non-tacky, clear, colorless, glossy, coherent coatings.

| Formulations for Dispersions of Polymer A in Water | | | | | | | | | | |
|---|---|---|---|---|---|---|---|---|---|---|
| Composition, pbw | 1 | 2 | 3 | 4 | 5 | 6 | 7 | 8 | 9 | 10 |
| Polymer A | 100 | 80 | 80 | 80 | 80 | 80 | 80 | 80 | 80 | 80 |
| CYMEL 303 | | 20 | 20 | 20 | | | | | | |
| CYMEL 1141 | | | | | 20 | 20 | 20 | 20 | 20 | 20 |
| CYCAT 600 | 2 | 2.5 | 2.5 | 2.5 | 2.5 | 2 | 2 | 2 | 2 | 2 |
| NH3 | 0.9 | 1.1 | 1.1 | 1.1 | 1.0 | 0.9 | 0.9 | 0.9 | | |
| TEA | | | | | | | | | 2 | 2 |
| BYK-034 | 0.1 | 0.1 | 0.1 | 0.1 | 0.1 | 0.1 | 0.1 | 0.1 | 0.1 | |
| BUTYL OXITOL | | | 10 | 20 | | | 10 | 20 | 10 | 20 |

-continued

Formulations for Dispersions of Polymer A in Water

| Composition, pbw | 1 | 2 | 3 | 4 | 5 | 6 | 7 | 8 | 9 | 10 |
|---|---|---|---|---|---|---|---|---|---|---|
| Deionized Water | 100 | 100 | 100 | 100 | 100 | 100 | 100 | 100 | 100 | 165 |
| Dispersion Process[1] | Inv | Sil | Inv | Inv | Sil | Inv | Inv | Inv | Inv | Inv |
| Dispersion Appearance | nice | fail | fail | fail | nice | fail[3] | very nice | nice | very nice | very nice |
| Storage Stability[2] | nice |  |  |  |  |  | coag. | nice, creamed | nice | very nice |

[1]Dispersion Process: Inv = inversion process, Sil = water-continuous process with Silverson mixer.
[2]Storage Stability: Appearance of dispersion after storage at ambient conditions for up to 3 months.
[3]Mixture thickened when water was added and became so thick it climbed out of can.

Example 4

A dispersion of Polymer B was prepared following the same procedure used to disperse Composition #10 in water. The procedure worked very well, resulting in a low viscosity, milky white dispersion which remained stable upon storage showing no coagulation or phase separation. Films of this dispersion of Polymer B cast on aluminum and baked 20 minutes at 175° C., were hard, clear, glossy coatings having a pale yellow color.

We claim:

1. A coating formed by crosslinking a waterborne dispersion which is applied to a substrate, said waterborne dispersion comprising:
   (a) 10 to 65% by weight of a polydiene block polymer having a weight average molecular weight of from 2000 to 3,000,000 and containing at least five olefinic epoxy groups per molecule which are sterically hindered;
   (b) 0.2 to 25% by weight of a compatible aminoplast;
   (c) 0.1 to 10% by weight of a surfactant which is nonionic or anionic and has a volatile cation;
   (d) 0.1 to 4% by weight of a proton-donating acid catalyst; and
   (e) water.

2. The coating of claim 1, wherein the aminoplast is a butylated aminoplast.

3. The coating of claim 1, wherein the acid is an acid which catalyzes crosslinking of the polymer and the aminoplast.

4. The coating of claim 1, wherein the amine is a tertiary amine selected from the group consisting of triethylamine, triisopropylamine, methyidiethanolamine and dimethylethanolamine.

5. The coating of claim 1, wherein the surfactant is an amine salt of an organic acid.

6. The coating of claim 1, wherein the water is present in the waterbome dispersion at a weight ratio of the water to the polydiene block polymer ranging from 100:80 to 165:80.

7. An adhesive formed by crosslinking a waterbome dispersion which is applied to a substrate, said waterbome dispersion comprising:
   (a) 10 to 65% by weight of a polydiene block polymer having a weight average molecular weight of from 2000 to 3,000,000 and containing at least five olefinic epoxy groups per molecule which are sterically hindered;
   (b) 0.2 to 25% by weight of a compatible aminoplast;
   (c) 0.1 to 10% by weight of a surfactant which is nonionic or anionic and has a volatile cation;
   (d) 0.1 to 4% by weight of a proton-donating acid catalyst; and
   (e) water.

8. The adhesive of claim 7, wherein the aminoplast is a butylated aminoplast.

9. The adhesive of claim 7, wherein the surfactant is an amine salt of an organic acid.

10. The adhesive of claim 7, wherein the acid is an acid which catalyzes crosslinking of the polymer and the aminoplast.

11. The adhesive of claim 7, wherein the amine is a tertiary amine selected from the group consisting of triethylamine, triisopropylamine, methyidiethanolamine and dimethylethanolamine.

12. The adhesive of claim 7, wherein the water is present in the waterbome dispersion at a weight ratio of the water to the polydiene block polymer ranging from 100:80 to 165:80.

13. A sealant formed by crosslinking a waterbome dispersion which is applied to a substrate, said waterbome dispersion comprising:
   (a) 10 to 65% by weight of a polydiene block polymer having a weight average molecular weight of from 2000 to 3,000,000 and containing at least five olefinic epoxy groups per molecule which are sterically hindered;
   (b) 0.2 to 25% by weight of a compatible aminoplast;
   (c) 0.1 to 10% by weight of a surfactant which is nonionic or anionic and has a volatile cation;
   (d) 0.1 to 4% by weight of a proton-donating acid catalyst; and
   (e) water.

14. The sealant of claim 13, wherein the aminoplast is a butylated aminoplast.

15. The sealant of claim 13, wherein the surfactant is an amine salt of an organic acid.

16. The sealant of claim 13, wherein the acid catalyzes crosslinking of the polymer and the aminoplast.

17. The sealant of claim 13, wherein the amine is a tertiary amine selected from the group consisting of triethylamine, triisopropylamine, methyidiethanolamine and dimethylethanolamine.

18. The sealant of claim 13, wherein the water is present in the waterbome dispersion at a weight ratio of the water to the polydiene block polymer ranging from 100:80 to 165:80.

* * * * *